(12) United States Patent
Kramlich

(10) Patent No.: US 8,573,092 B2
(45) Date of Patent: Nov. 5, 2013

(54) ROTATING ACTUATOR WITH A VARIABLE LATCHING PROFILE

(75) Inventor: Andreas Kramlich, Schweinfurt (DE)

(73) Assignee: Preh GmbH (DE)

( * ) Notice: Subject to any disclaimer, the term of this patent is extended or adjusted under 35 U.S.C. 154(b) by 762 days.

(21) Appl. No.: 12/668,632

(22) PCT Filed: Jul. 10, 2008

(86) PCT No.: PCT/EP2008/005622
§ 371 (c)(1),
(2), (4) Date: May 10, 2010

(87) PCT Pub. No.: WO2009/007111
PCT Pub. Date: Jan. 15, 2009

(65) Prior Publication Data
US 2010/0218639 A1 Sep. 2, 2010

(30) Foreign Application Priority Data
Jul. 10, 2007 (DE) .......................... 10 2007 032 395

(51) Int. Cl.
*G05G 1/02* (2006.01)
*G05G 1/08* (2006.01)

(52) U.S. Cl.
CPC . *G05G 1/08* (2013.01); *G05G 1/087* (2013.01)
USPC ............. 74/553; 74/527; 74/10.54; 74/10.52; 74/10.41; 335/280; 335/170; 200/564; 188/156

(58) Field of Classification Search
USPC ......... 74/553, 10 R, 10.1–10.37, 10.41, 10.6, 74/10 A; 345/184; 219/507; 188/31, 158, 188/161, 265

IPC ........................................................ H01H 19/11
See application file for complete search history.

(56) References Cited

U.S. PATENT DOCUMENTS

| | | | | |
|---|---|---|---|---|
| 1,950,143 A | * | 3/1934 | Haviland | .................... 200/11 H |
| 2,130,153 A | * | 9/1938 | Plensler | ....................... 74/10.35 |
| 2,849,571 A | * | 8/1958 | Duffing | .......................... 335/170 |
| 3,142,187 A | * | 7/1964 | Kane et al. | ...................... 74/107 |
| 3,618,405 A | * | 11/1971 | Ishida | .......................... 74/10.52 |

(Continued)

FOREIGN PATENT DOCUMENTS

| | | |
|---|---|---|
| DE | 202 19 655 | 3/2003 |
| DE | 10 2005 042883 | 12/2006 |

(Continued)

OTHER PUBLICATIONS

International Search Report; PCT/EP2008/005622; Nov. 6, 2008.

*Primary Examiner* — Richard W Ridley
*Assistant Examiner* — William Santosa
(74) *Attorney, Agent, or Firm* — Cantor Colburn LLP

(57) ABSTRACT

Disclosed is a rotating actuator with a variable latching profile, the rotating actuator having a housing, a rotary knob and a rotary shaft connected in a rotationally fixed manner to the rotary knob, and also at least two latching contours connected in a rotationally fixed manner to the rotary shaft, one support per latching contour, on which support at least one latching element is arranged, the latching element engaging in the latching contour assigned to the support, and which support is mounted rotatably about the rotary shaft, and at least one locking device per support, by means of which the support can be locked relative to the housing.

8 Claims, 4 Drawing Sheets

(56) References Cited

U.S. PATENT DOCUMENTS

Figure 1:
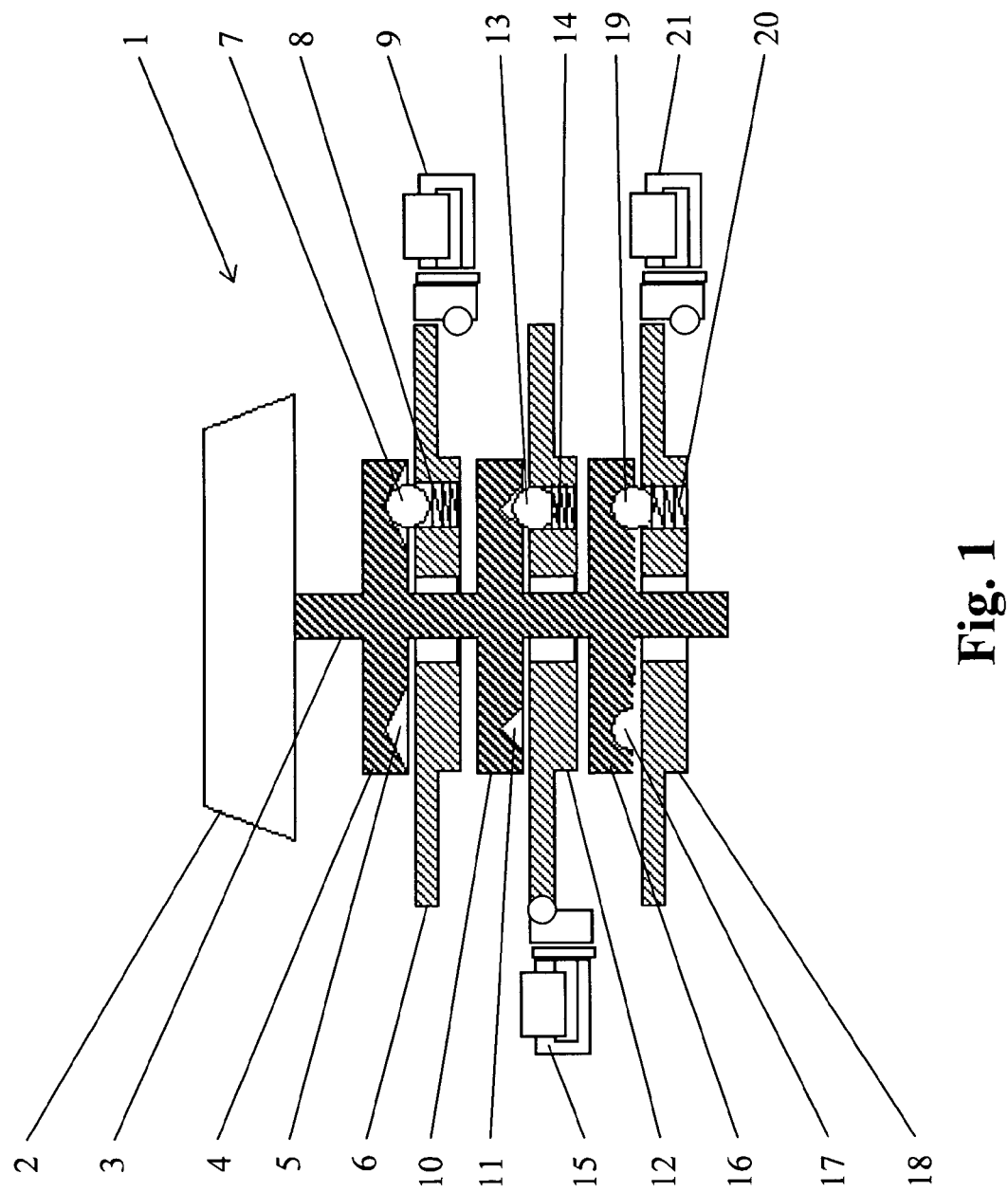

| | | | | |
|---|---|---|---|---|
| 3,871,237 A | * | 3/1975 | Miner | 74/10.54 |
| 4,352,415 A | * | 10/1982 | Powell | 188/156 |
| 2002/0080114 A1 | * | 6/2002 | Numata et al. | 345/156 |
| 2002/0148715 A1 | * | 10/2002 | Oster et al. | 200/564 |

FOREIGN PATENT DOCUMENTS

| | | |
|---|---|---|
| DE | 10 2005 043587 | 12/2006 |
| EP | 1 217 496 | 6/2002 |
| EP | 1 795 990 | 6/2007 |
| WO | 02/088864 | 11/2002 |

* cited by examiner

ROTATING ACTUATOR WITH A VARIABLE LATCHING PROFILE

CROSS-REFERENCE TO RELATED APPLICATIONS

This patent application claims priority to co-pending German Patent Application No. DE 10 2007 032 395.8, filed Jul. 10, 2007 which is hereby expressly incorporated by reference in its entirety as part of the present disclosure.

BACKGROUND OF THE INVENTION

The present invention relates to a rotating actuator with a variable latching behavior according to the preamble of the patent claim 1.

BRIEF DESCRIPTION OF RELATED ART

In the case of rotating actuators, in particular in motor vehicles, it is desirable to provide the operator with a haptic feedback concerning the rotation of the rotating actuator by a certain amount, in order to indicate the completion of an operating step, for example. For this purpose, rotating actuators comprising a latching behavior are known in which a latching element latches into a latching contour. This, however, is disadvantageous in that such a rotating actuator has an invariable latching behavior and is thus suitable only in a limited extent for operating a plurality of functions, for example, of an on-board computer.

An electronically controlled fluid rotary knob as a haptic control element is known from the published patent application DE 100 29 191 A1, wherein the rotary knob of the rotating actuator moves in a magnetorheological fluid, the viscosity of which can be controlled by means of a magnetic field. By controlling the magnetic field it is possible to generate different latching behaviors. Such a rotating actuator has a complex structure, is expensive to manufacture and requires a complicated control system.

BRIEF SUMMARY OF THE INVENTION

It is the object of the present invention to provide a rotating actuator with a variable latching behavior that does not exhibit the drawbacks of the prior art.

The object is achieved by a rotating actuator in accordance with patent claims 1 and 2. Advantageous embodiments are apparent from the dependent patent claims.

A rotating actuator with a variable latching behavior according to patent claim 1 comprises a housing, a rotary knob, a rotary shaft non-rotatably connected to the rotary knob and at least two latching contours non-rotatably connected to the rotary shaft. Furthermore, the rotating actuator comprises one support per latching contour, whereon at least one latching element is disposed which latches into the latching contour associated with the support, and which is mounted so as to be rotatable about the rotary shaft. The number of the supports matches the number of the latching contours. In addition, the rotating actuator comprises at least one locking device per support, by means of which the support can be locked relative to the housing.

In an alternative embodiment according to patent claim 2, the rotating actuator comprises a housing, a rotary knob, a rotary shaft non-rotatably connected to the rotary knob and at least two latching elements non-rotatably connected to the rotary shaft. Upon rotation of the rotary knob, the latching elements thus move together with the rotary shaft. Furthermore, the rotating actuator has one support per latching element, with a latching contour being disposed on the support, into which the latching element associated with the support latches, and wherein the support is mounted so as to be rotatable about the rotary shaft. In addition, the rotating actuator comprises at least one locking device per support, by means of which the support can be locked relative to the housing. The number of the supports preferably matches the number of the latching elements. Optionally, the number of the latching elements is greater than the number of the supports if two latching elements latch into the latching contour of the same support.

The latching elements establish a connection in a positive fit between the latching contours, and thus the rotary knob, and the supports. If all the locking devices are deactivated, that is, the supports are not locked, then a rotation of the rotary knob causes a rotation of the supports. The supports rotate with the same angular speed as the rotary knob.

If the locking device is activated, then the associated support is fixed relative to the housing of the rotating actuator. A rotation of the rotary knob is opposed by a force generated in a known manner by the latching element and the latching contour. If the operator overcomes this force, the rotary knob and the rotary shaft rotate relative to the locked support. The latching element moves over the latching contour and the operator receives a haptic feedback concerning the rotation of the rotary knob in the form of a latching stop. The behavior of the latching stop over the angle of rotation of the rotary knob in this case substantially depends on the design of the latching contour.

If the locking device of the other support is activated, then this other support is fixed relative to the housing of the rotating actuator. When the rotary knob is rotated, the result is a latching behavior which substantially depends on the latching contour into which the latching element disposed on the fixed other support latches. Thus, the latching behavior can be varied by selecting the locked support. For this purpose, the latching contour and/or the latching elements preferably are configured in different ways. Optionally, several supports can be locked simultaneously, so that the latching behavior is a result of the superposition of the individual latching stops.

The latching contour is a successive arrangement of depressions and elevations, so that the result is, for example, a saw-tooth profile or an undulating profile. Preferably, the latching contour forms a closed circle. Depending on the configuration of the rotating actuator, the latching contour is located on the inside or the outside of the support. The number of latching positions per complete revolution of the rotary knob depends upon the number of depressions of the latching contour. The force for overcoming a latching stop is dependent, among other things, upon the height of the elevations relative to the depressions. The force curve of the latching stop depends on the shape of the flanks of the latching profile. The latching element preferably is a spring-mounted ball or a latch spring.

The locking device is preferably disposed stationary in the housing. It has, for example, a locking bar which is introduced into a recession of the support associated with the locking device or withdrawn from the recession by means of, for example, a feed mechanism. In another embodiment, the locking device comprises a magnetic ball latching device as it is described below.

A magnetic ball latching device comprises at least one permanent magnet, an electromagnet on a ferromagnetic core, and a ball which can be brought into engagement with a latching profile in a support. In this case, the permanent magnet is movably disposed in the device and can be moved between at least two end positions.

The permanent magnet is disposed between the open end of the ferromagnetic core and the ball. The ball consists of a magnetic or magnetizable material so that a force is exerted on the ball by a magnetic field. In each of its end positions, the permanent magnet is located in the area of the end of a leg of the ferromagnetic core. The magnetic field of the permanent magnet extends into the legs of the ferromagnetic core and thus retains the permanent magnet in its position.

A change of position of the permanent magnet is achieved by applying current to the electromagnet, so that a magnetic field forms in the ferromagnetic core as a consequence. The direction of the current through the electromagnet, and thus the direction of the magnetic field in the ferromagnetic core, is selected such that the magnetic pole corresponding to the pole of the permanent magnet facing the ferromagnetic core forms at that leg in the area of which the permanent magnet is located. This causes a repulsion of the permanent magnet from its current position into the other end position. Preferably, the movable permanent magnet is configured such that the permanent magnet is prevented from tipping over. In this context, tipping over means that the permanent magnet rotates in such a way that the other magnetic pole faces the ferromagnetic core.

The ball located in the area of the magnetic field of the permanent magnet follows the movement of the permanent magnet and can thus also be moved, for example, between two end positions. In one end position, the ball is in engagement with the latching profile in the support and thus blocks the movement of the support at least in one direction. In another end position, the ball is not in engagement with the latching profile. Due to the relatively small distance between the ball and the permanent magnet, a comparatively weak permanent magnet already leads to a strong magnetic force on the ball, and thus to a high resistance to vibration.

Preferably, the ferromagnetic core, which for example consists of iron, is substantially formed to be U-shaped. However, any other, in particular asymmetric, shape of the ferromagnetic core is possible without limiting the locking functionality.

The electromagnet disposed on the ferromagnetic core and the movable permanent magnet form a mechanical bistable flip-flop, with the ball following the position of the permanent magnet. Even if the ball is jammed in the latching profile, the permanent magnet is movable. If the ball is not jammed anymore at a later point in time, it follows the permanent magnet and withdraws from the engagement with the latching profile.

BRIEF DESCRIPTION DRAWINGS

Figure 2:
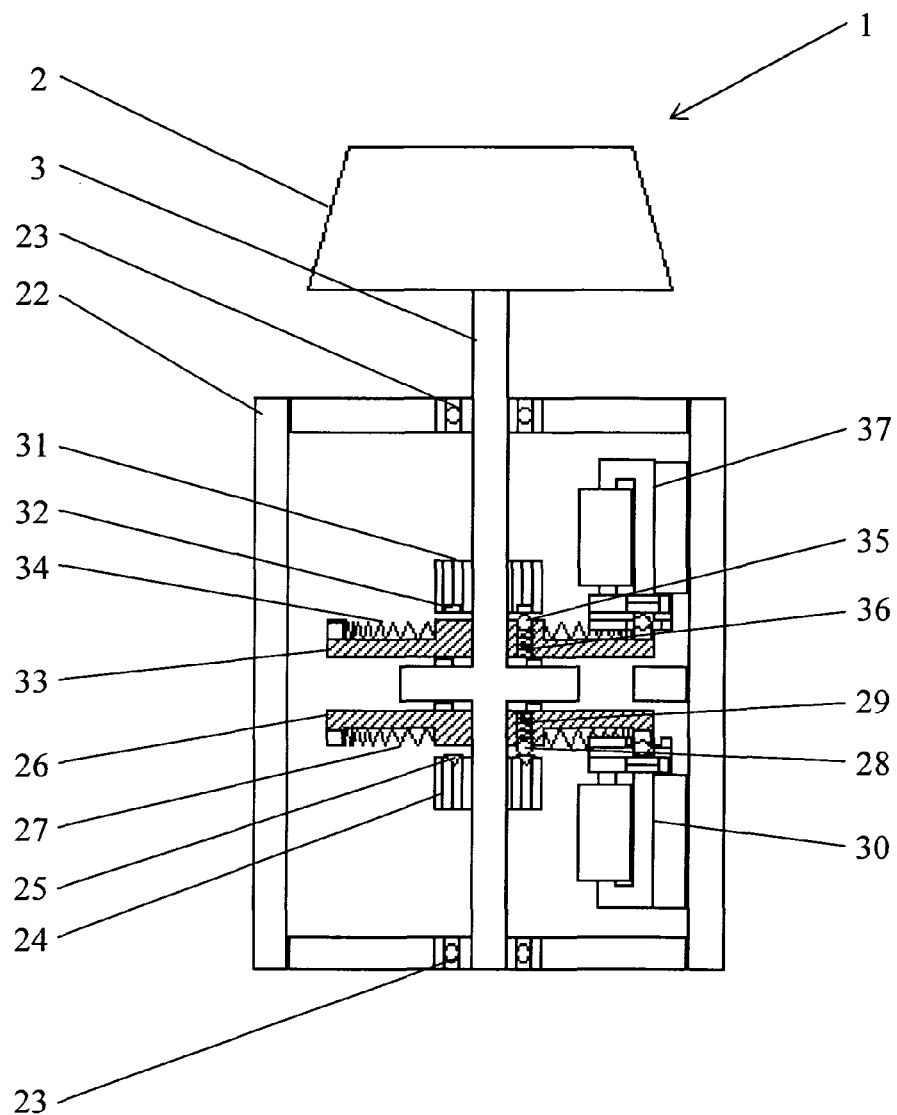
Figure 3:
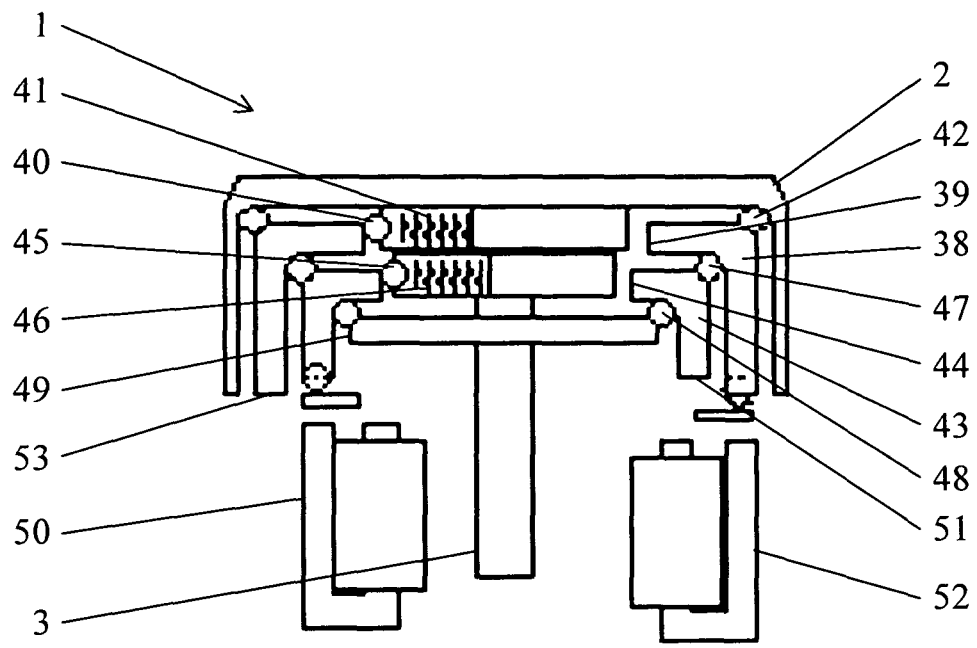
Figure 4:
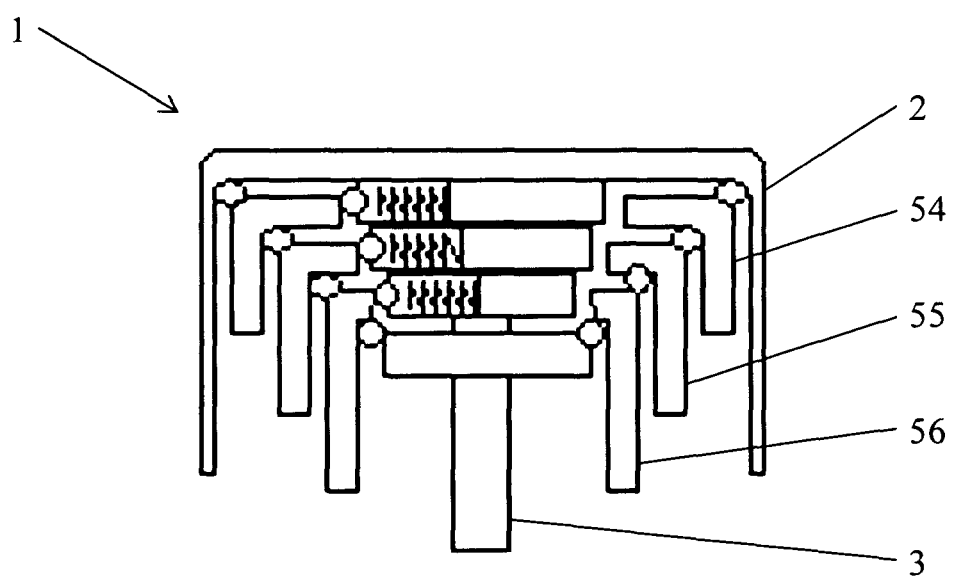
Figure 5:
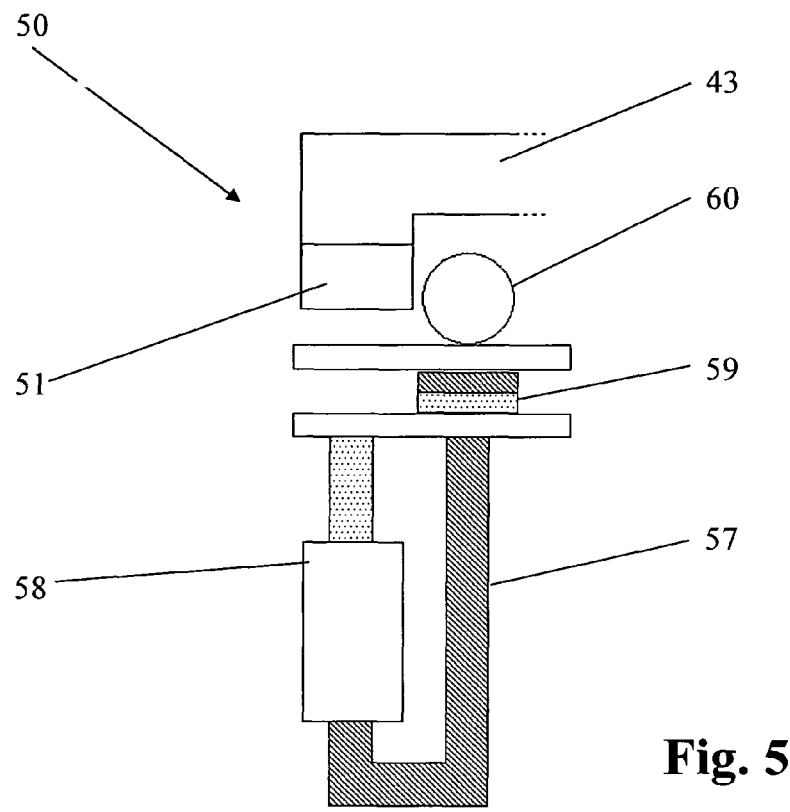
Figure 6:
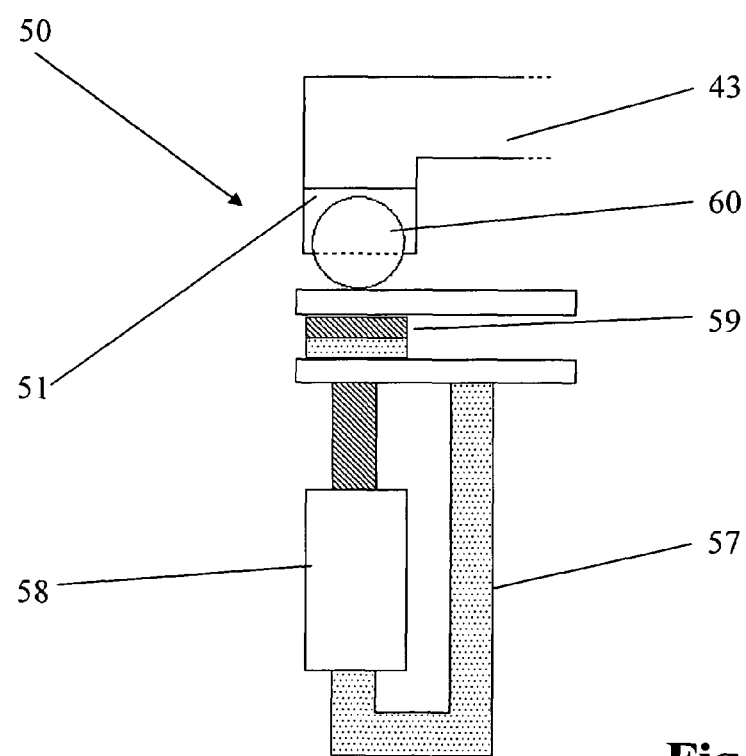

The present invention is now to be explained in more detail with reference to four exemplary embodiments. In the drawings:

FIG. 1 shows a first embodiment of the rotating actuator according to the invention comprising three latching contours, FIG. 2 shows a second embodiment of the rotating actuator according to the invention comprising two latching contours, FIG. 3 shows a third embodiment of the rotating actuator according to the invention comprising two latching contours, FIG. 4 shows a fourth embodiment of the rotating actuator according to the invention comprising three latching contours, FIG. 5 shows a detailed view of a magnetic ball latching device, and FIG. 6 shows a detailed view of a magnetic ball latching device in engagement with a latching profile.

DETAILED DESCRIPTION OF THE INVENTION

FIGS. 1 to 4 show schematic sectional views of different embodiments of the rotating actuator 1 according to the invention comprising a rotary knob 2 and a rotary shaft 3 non-rotatably connected with the rotary knob. For providing a better overview, the housing was omitted in FIGS. 1, 3 and 4. Recurring identical elements are provided with identical reference numerals.

The rotating actuator 1 according to FIG. 1 comprises three latching contours 5, 11 and 17, which are respectively incorporated in one of the latching discs 4, 10 and 16. The latching discs 4, 10 and 16 are non-rotatably connected with the rotary shaft 3 or formed integrally with the rotary shaft 3. Three disc-like supports 6, 12 and 18 are mounted so as to be rotatable about the rotary shaft 3. A ball 7 latching into the latching contour 5 of the latching disc 4 is mounted on the support 6 by means of a spring 8. A ball 13 latching into the latching contour 11 of the latching disc 10 is mounted on the support 12 by means of a spring 14. A ball 19 latching into the latching contour 17 of the latching disc 16 is mounted on the support 18 by means of a spring 20.

Three magnetic ball latching devices 9, 15 and 21, which respectively include a movable ball, are disposed stationary in the housing of the rotating actuator 1. As will be described with reference to FIGS. 5 and 6, the balls can be brought into engagement with the latching profiles in the outer circumference of the supports 6, 12 and 18. If a ball latches into a latching profile, the corresponding support is locked. This means that the support is incapable of rotating in the housing of the rotating actuator 1.

If none of the ball latching devices 9, 15 and 21 is activated, then all three supports 6, 12 and 18 can be rotated about the rotary shaft 3. If the rotary knob 2 is rotated, the balls 7, 13 and 19 exert forces on the supports 6, 12 and 18, so that they rotate at the same angular speed as the rotary knob 2.

In FIG. 1, the position of the balls of the ball latching devices is indicated by circles. In the present case, the latching device 15 is activated, that is, the ball of the latching device 15 is in engagement with the latching profile on the circumference of the support 12. The rotation of the support 12 is thus disabled and the ball 13 runs through the latching contour 11 in the latching disc 10 upon rotation of the rotary knob 2. For overcoming a latching stop, a flank of the latching contour 11 urges the ball 13 against the force of the spring 14 in the direction of the support 12. This can be haptically perceived by the operator of the rotating actuator 1 as a latching stop.

The latching contours 5, 11 and 17 are configured in different ways, as is indicated in FIG. 1. Due to the different configuration of the latching contours, the force curve changes when a latching stop is being overcome, and/or the number of latching stops per rotation of the rotary knob 2. By selecting which ball latching device is activated and thus, which of the supports is locked, the latching behavior of the rotating actuator 1, that is, its haptic characteristic curve, can be varied. Depending on the desired latching behavior, one or more of the supports is locked.

In a second embodiment according to FIG. 2, the rotary shaft 3 is rotatably mounted in a housing 22 by means of ball bearings 23. The rotary shaft 3 comprises two cylindrical latching discs 24 and 31 spaced in the direction of the axis of the rotary shaft 3 and formed concentrically with the rotary shaft 3. Latching contours 25 and 32, respectively, which are configured differently, are incorporated in the end faces of the latching discs 24 and 31 that face each other.

Between the latching discs 24 and 31, the supports 26 and 33 are disposed so as to be rotatable about the rotary axis 3. The support 26 retains a ball 28 which is movable against the force of a spring 29 in the direction of the axis of the rotary shaft 3. An annular saw-tooth latching profile 27 is disposed on the outer edge of the disc-like support 26. The support 33 retains a ball 35 which is movable against the force of a spring 36 in the direction of the axis of the rotary shaft 3. An annular saw-tooth latching profile 34 is disposed on the outer edge of the disc-like support 33.

A ball of a ball latching device 30 can be introduced into the latching profile 27, a ball of a ball latching device 37 can be introduced into the latching profile 34. If a ball latching device is activated, that is, if a ball has been introduced into a latching profile, then the associated support is locked, that is, its rotation relative to the housing 22 is blocked.

In analogy to the first exemplary embodiment, the rotary knob 2 can be freely rotated when the ball latching devices 30 and 37 are deactivated. For example, if the ball latching device 30 is activated, its ball latches into the latching profile 27 and locks the support 26. If the rotary knob 2 is now rotated, the ball 28 moves over the latching contour 25 and is displaced against the force of the spring 29 in the process. The operator of the rotating actuator 1 perceives this haptically as a latching behavior. A latching behavior results in an analogous manner if the ball latching device 37 is activated and if the ball 35 moves over the latching contour 32. If the latching contours 25 and 32 are configured differently, then different latching behaviors result. If both ball latching devices 30 and 37 are activated, the result is a superposed latching behavior.

FIG. 3 shows another exemplary embodiment in which the rotating actuator 1 comprises a cup-shaped rotary knob 2. Two supports 38 and 43 are also configured cup-shaped and are disposed concentrically relative to each other and to the rotary knob 2 so as to be rotatable about the rotary shaft 3. The support 38 is mounted in the rotary knob 2 by means of a ball bearing 42, the support 43 is mounted in the support 38 by means of a ball bearing 47. A circular retaining disc 49, which extends perpendicularly to the rotary shaft 3, and through the center of which the rotary shaft 3 extends, retains the support 43, and thus also the support 38, by means of a ball bearing 48.

Two latching balls 40 and 45 are non-rotatably connected with the rotary shaft 3, they thus rotate with the same angular speed as the rotary knob 2. The latching balls 40 and 45 are mounted by means of springs 41 and 46, respectively, so that, relative to the rotary shaft 3, they are movable in the radial direction. The ball 40 latches into a latching contour 39 in the support 38, the ball 45 latches into a latching contour 44 in the support 43. The latching contours 39 and 44 extend along the circumference of circular recesses in the bottom surfaces of the supports 38 and 43, respectively.

A latching profile 53, which cooperates with a ball latching device 52, is incorporated in the annular edge of the support 38. A latching profile 51, which cooperates with a ball latching device 50, is incorporated in the annular edge of the support 43. Just as in the preceding exemplary embodiments, the supports 38 and 43 are freely rotatable about the rotary shaft 3 when the ball latching devices 50 and 52 are deactivated. If the rotary knob 2 is rotated, the balls 40 and 45 entrain the supports 38 and 43, respectively.

If a ball latching device 50 or 52 is activated, a ball latches into the associated latching profile 51 or 53, respectively, whereby the support 43 or 38, respectively, is locked. If the ball latching device 50 is activated, then the ball 45 moves over the latching contour 44 when the rotary knob 2 is rotated and generates a latching behavior which can be perceived as a rotary haptic feedback by the operator of the rotating actuator 1. If the ball latching device 52 is activated, then the ball 40 moves over the latching contour 39 when the rotary knob 2 is rotated and generates a latching behavior which preferably deviates from the latching behavior generated by the ball 45 in conjunction with the latching contour 44.

Another embodiment of the rotating actuator 1 according to FIG. 4 differs from the rotating actuator according to FIG. 3 in that three cup-shaped supports 54, 55 and 56 are disposed concentrically relative to one another and to the rotary knob 2. The supports 54, 55 and 56 are rotatable about the rotary axis 3 and can be locked separately by means of ball latching devices that are not shown. An unlocked support is rotated by an associated latching ball when the rotary knob 2 is rotated, in the case of a locked support, the latching ball moves over a latching contour on or in the support 54, 55 or 56 and generates a corresponding latching behavior. The rotating actuators 1 according to the FIGS. 3 and 4 are particularly compact.

FIGS. 5 and 6 show, by way of example, the ball latching device 50 from FIG. 3. The ball latching device 50 substantially consists of an electromagnet 58 on a ferromagnetic, U-shaped core 57, a permanent magnet 59 and a magnetizable ball 60. The permanent magnet 59 is mounted so as to be displaceable between two end positions, and disposed and guided in such a way that one of its magnetic poles permanently points in the direction of the ferromagnetic core 57. In each of its end positions, the permanent magnet is located in the area of one of the legs at the open end of the ferromagnetic core 57. Because of the magnetic force, the magnetizable ball 60 follows the movement of the permanent magnet 59. In FIGS. 5 and 6, the magnetic north pole is represented in a dotted way and the magnetic south pole in a hatched way.

In the state shown in FIG. 5, the ball latching device 50 is deactivated. The permanent magnet 59 is in its first end position and the ball 60 is not in engagement with the latching profile 51 of the support 43.

If the ball latching device 50 is activated, the electromagnet 58 reverses the magnetic field in the ferromagnetic core 57. A magnetic force acts on the permanent magnet 59 which moves it into its second end position shown in FIG. 6. The ball 60 follows the movement of the permanent magnet 59 and thus comes into engagement with the latching profile 51 of the support 50. The support 43 is now locked.

The magnetic ball latching devices 9, 15, 21, 30, 37 and 52 substantially have the same structure as the magnetic ball latching device 50.

What is claimed is:

1. A rotating actuator with a variable latching profile, comprising a housing, a rotary knob and a rotary shaft non-rotatably connected to the rotary knob, comprising:
   at least two latching contours non-rotatably formed on the rotary shaft,
   one support per latching contour, whereon at least one latching element is disposed which latches into the latching contours associated with the support, and which is mounted so as to be rotatable about the rotary shaft, and
   at least one locking device per support, the support being lockable relative to the housing via the at least one locking device,
   wherein the locking device includes a magnetic ball latching device, and wherein the magnetic ball latching device comprises at least one permanent magnet, an electromagnet on a ferromagnetic core, and a ball that is engaged with the latching contours in the support, the permanent magnet being movably disposed in the ball latching device and movable between at least two end positions.

2. A rotating actuator with a variable latching profile, comprising a housing, a rotary knob and a rotary shaft non-rotatably connected to the rotary knob, comprising:
   at least two latching elements non-rotatably engaged with the rotary shaft,
   one support per latching element, with a latching contour being disposed on the support, into which the latching elements associated with the support, and
   wherein the support is mounted so as to be rotatable about the rotary shaft , and
   at least one locking device per support, the support lockable relative to the housing via the at least one locking device,
   wherein the locking device includes a magnetic ball latching device, and wherein the magnetic ball latching device comprises at least one permanent magnet, an electromagnet on a ferromagnetic core, and a ball that is engaged with the latching contour in the support, the permanent magnet being movably disposed in the ball latching device and movable between at least two end positions.

3. The rotating actuator according to claim 1, wherein the latching element is a latching spring.

4. The rotating actuator according to claim 1, wherein the latching element is a spring-mounted ball.

5. The rotating actuator according to claim 1, wherein the locking device comprises a locking bar.

6. The rotating actuator according to claim 2, wherein the latching element is a latching spring.

7. The rotating actuator according to claim 2, wherein the latching element is a spring-mounted ball.

8. The rotating actuator according to claim 2, wherein the locking device comprises a locking bar.

* * * * *